United States Patent [19]
Takimoto et al.

[11] Patent Number: 5,414,260
[45] Date of Patent: May 9, 1995

[54] SCANNING PROBE MICROSCOPE AND METHOD OF OBSERVING SAMPLES BY USING THE SAME

[75] Inventors: Kiyoshi Takimoto, Isehara; Katsunori Hatanaka, Yokohama; Kunihiro Sakai, Isehara; Masahiko Miyamoto, Tokyo; Hisaaki Kawade, Yokohama; Yasufumi Sato, Atsugi; Etsuro Kishi, Sagamihara; Hideyuki Kawagishi, Ayase, all of Japan

[73] Assignee: Canon Kabushiki Kaisha, Tokyo, Japan

[21] Appl. No.: 54,133

[22] Filed: Apr. 30, 1993

[30] Foreign Application Priority Data

May 1, 1992 [JP] Japan .................................. 4-112825

[51] Int. Cl.⁶ ............................................ H01J 37/00
[52] U.S. Cl. ..................................... 250/306; 250/307
[58] Field of Search .............................. 250/306, 307

[56] References Cited

U.S. PATENT DOCUMENTS

| | | | |
|---|---|---|---|
| 4,954,704 | 9/1990 | Elings et al. | 250/306 |
| 5,051,646 | 9/1991 | Elings et al. | 250/307 |
| 5,077,473 | 12/1991 | Elings et al. | 250/306 |
| 5,107,113 | 4/1992 | Robinson | 250/306 |
| 5,260,572 | 11/1993 | Marshall | 250/307 |

Primary Examiner—Bruce C. Anderson
Attorney, Agent, or Firm—Fitzpatrick, Cella, Harper & Scinto

[57] ABSTRACT

A scanning probe microscope is used to observe a sample. The same portion of a surface of the sample is scanned forward and backward using a probe. A first signal corresponding to a structure of the sample is detected from the probe during a period in which the probe scans the surface of the sample forward. A second signal corresponding to the structure of the sample is detected from the probe during a period in which the probe scans the surface of the sample backward. When a difference is caused in at least a portion between the first and second signals, the portion of one of the first and the second signals is replaced by a portion of the other signal to generate a corrected signal. An image of the sample is formed using the corrected signal.

18 Claims, 7 Drawing Sheets

SCANNING PROBE MICROSCOPE AND METHOD OF OBSERVING SAMPLES BY USING THE SAME

BACKGROUND OF THE INVENTION

1. Field of the Invention

The present invention relates to a scanning probe microscope for obtaining observed images of samples by using physical phenomena (e.g., a tunnel current and an interatomic force) observed when a probe is moved closer to the samples, and a method of observing samples by using this microscope.

2. Related Background Art

Recently, a scanning tunneling microscope (STM) capable of directly observing the electron structure of a surface atom of a conductor has been developed and is expected to be put to use in a wide variety of applications for the reasons explained below.

(1) The STM can observe real space images of samples with a high resolving power regardless of whether the samples are single-crystal or amorphous.

(2) The STM has an advantage that it can observe samples with a low electric power without damaging them by an electric current.

(3) The STM can be operated even in the atmosphere and can be used for various materials.

For example, G. Binning et al., Helvetica Physica Acta, 55, 726, 1982 reports that a molecular image of an organic molecule adsorbed in the surface of a conductor was observed by using the STM.

The STM makes use of a tunnel current that flows between a metal probe (probe electrode) and the surface of a conductive substance when the probe is moved closer to a distance of about 1 nm from the surface of the conductive substance with a voltage applied between the probe and the substance. The magnitude of this tunnel current depends on the distance between the probe and the surface of the conductive substance and is very sensitive to the change in distance. For this reason, while controlling the distance between the probe and the surface of the conductive substance so that the tunnel current is maintained constant, the probe is scanned two-dimensionally above and relative to the surface of the conductive substance, thereby measuring the real space surface structure (surface undulations) of the conductive substance. At the same time, it is possible to read various pieces of information concerning the entire electron cloud of surface atoms. Note that the resolving power in the direction of the surface of the conductive substance in this case is about 1 Å.

Meanwhile, an atomic force microscope (AFM) taking advantage of the technology of the STM has been developed, and this also makes it possible to obtain the surface structures and the like of samples as does the STM (G. Binning et al., Phys. Rev. Lett., 56, 930, 1985). The AFM obtains a real space image of the surface of a sample with a high surface resolving power by using an interatomic force sensitive to the distance between a probe and the surface of the sample. The AFM can perform measurements on the order of atoms even for insulating samples and therefore its further development is expected.

Not only the STM and the AFM described above but microscopes, which obtain distance information between a probe and the surface of a sample by using a physical quantity produced by an interaction between the probe and the surface of the sample and sensitive to the distance between them, or microscopes, which obtain a real space image of the surface structure or the surface condition of a sample with a high resolving power by maintaining the above-mentioned physical quantity constant by feedback control, are generally called scanning probe microscopes. These scanning probe microscopes are being developed as the technology derived from the STM.

FIG. 1 is a view for explaining the locus of a probe in obtaining the surface structure of a sample by using a scanning probe microscope.

Referring to FIG. 1, the distance between a probe 1 and the surface of a sample 10 is maintained constant at any instant by maintaining a physical quantity (e.g., a tunnel current or an interatomic force) sensitive to the distance between the probe 1 and the surface of the sample 10 constant by feedback control. Consequently, when the probe 1 is scanned in the direction indicated by an arrow shown in FIG. 1 above the surface of the sample 10 having a small projection $11_1$ and a small recess $11_2$, a locus L of the probe 1 traces the surface structure of the sample 10 as indicated by a broken line in FIG. 1. Therefore, an image representing the surface structure of the sample 10 can be obtained from a signal for scanning the probe 1 and a signal indicating the amount of feedback control for the physical quantity.

The above-mentioned conventional scanning probe microscope, however, has the following two significant problems.

The first problem is that since the scanning of the probe 1 is effected while feedback control is performed for the distance between the probe 1 and the surface of the sample 10, the scan rate of the probe 1 must be increased in order to shorten a time required to obtain the overall surface structure of the sample 10. When, however, the scan rate of the probe 1 is raised too high, the surface structure of the sample 10 cannot be obtained accurately for the reason explained below if a large projection or the like exists on the surface of the sample 10.

If a large projection 12 that the feedback control cannot follow exists between the projection $11_1$ and the recess $11_2$ on the surface of the sample 10 as shown in FIG. 2, the locus L of the probe 1 becomes the one indicated by a broken line in FIG. 2 when the scan rate of the probe 1 is raised too high. As a result, even when image processing is performed on the basis of the signal indicating the amount of feedback control for the physical quantity, no indication of the recess $11_2$ present on the right side of the projection 12 in FIG. 2 appears in the obtained image.

When a recess or a step of a size that the feedback control cannot trace exists on the surface of the sample 10, the surface structure of the sample 10 cannot be obtained correctly for the same reason as described above. In addition, the same problem arises in obtaining a real space image of the surface condition of a sample by using the conventional scanning probe microscope.

As described above, the conventional scanning probe microscope obtains a real space image of the surface structure or the surface condition of a sample by scanning a probe. Therefore, a time required to obtain the real space image of the surface structure or the surface condition of the sample is determined by the scan rate of the probe. In addition, since scan of the probe is performed while the distance between the probe and the surface of the sample is maintained constant by feedback control, the scan rate of the probe is limited according to the relationship between the frequency band of a feedback control circuit, which is limited by the mechanical resonance frequency of a probe scanning mechanism, and the spatial frequency that the probe must follow, which is determined by undulations on the surface of the sample. This introduces the following problems.

(1) To obtain a real space image of the surface structure or the surface condition of a sample at a high speed, it is required that no projection, recess, nor step, that the feedback control cannot trace, be present on the surface of the sample.

(2) When the scan rate of the probe is decreased to ensure the followability of the feedback control, a distortion may be produced in the resulting real space image of the surface structure or the surface condition of a sample because the secondary positional relationship is not expressed correctly owing to a thermal drift or the like.

The second significant problem is as follows. In scanning the probe 1 while performing feedback control for the distance between the probe 1 and the surface of the sample 10, the scan of the probe 1 is normally performed by moving the probe 1 or the sample 10 in the scan direction by using a piezoelectric element. In this case, however, a certain phenomenon (drift) occurs in which the relative positional relationship between the probe 1 and the surface of the sample 10 is gradually changed by the creep phenomenon of the piezoelectric element or the change in the ambient temperature. As an example, if a drift in which the relative positional relationship between the probe 1 and the surface of the sample 10 gradually widens takes place, the locus L of the probe 1 declines to the right, as shown in FIG. 3. This makes it impossible to accurately obtain a real space image of the surface structure of the sample 10.

When the above-mentioned drift is found in the conventional scanning probe microscope, therefore, a measurement of a real space image of the surface structure or the surface condition of the sample 10 is started after the resulting image is stabilized. As a consequence, it is not possible in practice to make the best use of one of the advantages of the scanning probe microscope over a scanning electron microscope, a short measurement time.

SUMMARY OF THE INVENTION

It is an object of the present invention to provide a scanning probe microscope capable of accurately observing samples at a high speed and a method of observing samples by using this microscope.

In order to achieve the above object of the present invention, a scanning probe microscope according to the first aspect of the present invention comprises:

a probe arranged to oppose a surface of a sample;

scanning means for scanning the same portion of the surface of the sample forward and backward by using the probe;

detecting means for detecting a signal corresponding to a structure of the sample from the probe, the detecting means detecting a first signal during a period in which the probe scans the sample forward and a second signal during a period in which the probe scans the sample backward; and correcting means for generating a corrected signal by replacing a portion of one of the first and second signals with a portion of the other signal.

A method of observing samples by using the scanning probe microscope of the above aspect of the present invention comprises the steps of:

scanning the same portion of a surface of a sample forward and backward by using a probe;

detecting a first signal corresponding to a structure of the sample from the probe during a period in which the probe scans the sample forward;

detecting a second signal corresponding to the structure of the sample from the probe during a period in which the probe scans the sample backward; and generating a corrected signal by replacing a portion of one of the first and second signals with a portion of the other signal.

A scanning probe microscope according to the second aspect of the present invention comprises:

a probe arranged to oppose a surface of a sample;

scanning means for scanning the same portion of the surface of the sample forward and backward by using the probe;

a detection circuit for detecting image data corresponding to a structure of the sample from the probe, the detection circuit sampling first image data consisting of N (=integer of 2 or more) samples during a period in which the probe scans the sample forward and second image data consisting of N samples during a period in which the probe scans the sample backward; and an image forming circuit for generating third image data consisting of N samples $Z_i$ (i=1, 2, ..., N), which satisfy an equation below, from the first and second image data:

$$Z_i = \left\{ (Z_{1i} + Z_{2i}) - \sum_{i=1}^{N} (Z_{1i} + Z_{2i})/N \right\}/2$$

where $Z_{1i}$ is the i-th sample of the first image data and $Z_{2i}$ is the sample of the second image data corresponding to $Z_{1i}$.

A scanning probe microscope according to the third aspect of the present invention comprises:

a probe arranged to oppose a surface of a sample;

scanning means for scanning the same portion of the surface of the sample forward and backward by using the probe;

a detection circuit for detecting image data corresponding to a structure of the sample from the probe, the detection circuit sampling first image data consisting of N (=integer of 2 or more) samples during a period in which the probe scans the sample forward and second image data consisting of N samples during a period in which the probe scans the sample backward; and an image forming circuit for generating third image data consisting of N samples $Z_i$ (i=1, 2, ..., N), which satisfy an equation below, from the first and second image data:

$$Z_i = (Z_{1i} + Z_{2i})/2$$

where $Z_{1i}$ is the i-th sample of the first image data and $Z_{2i}$ is the sample of the second image data corresponding to $Z_{1i}$.

In the scanning probe microscope according to the first aspect of the present invention, even if a projection, a recess, or a step that feedback control cannot trace exists on the surface of a sample, since the scan direction of the probe when the first image data is formed is opposite to the scan direction of the probe when the second image data is formed, a region in which the influence of the projection or the like occurs is different between the first and second image data. Therefore, a region where the projection or the like exists can be detected by comparing the first and second image data. In addition, by forming third image data by replacing the first or second image data with the other in the detected region containing the projection or the like, an image of the surface condition of the sample can be accurately formed.

In the scanning probe microscopes according to the second and third aspects of the present invention, even if the above-mentioned drift occurs, since the scan direction of the probe when the first image data is formed is opposite to the scan direction of the probe when the second image data is formed, the influence of the drift occurring in the first image data is also opposite to the influence of the drift occurring in the second image data. Therefore, the influences of the drift can be canceled out by performing a calculation given by:

$$Z_i = \left\{ (Z_{1i} + Z_{2i}) - \sum_{i=1}^{N} (Z_{1i} + Z_{2i})/N \right\}/2$$

or $$Z_i = (Z_{1i} + Z_{2i})/2$$

by using i-th data $Z_{1i}$ of the first image data and data $Z_{2i}$ of the second image data, which corresponds to the i-th data of the first image data. Consequently, an image of the surface condition of the sample can be correctly formed by using third image data $Z_i$ formed by the above calculation.

DETAILED DESCRIPTION OF THE PREFERRED EMBODIMENTS

Figure 1:
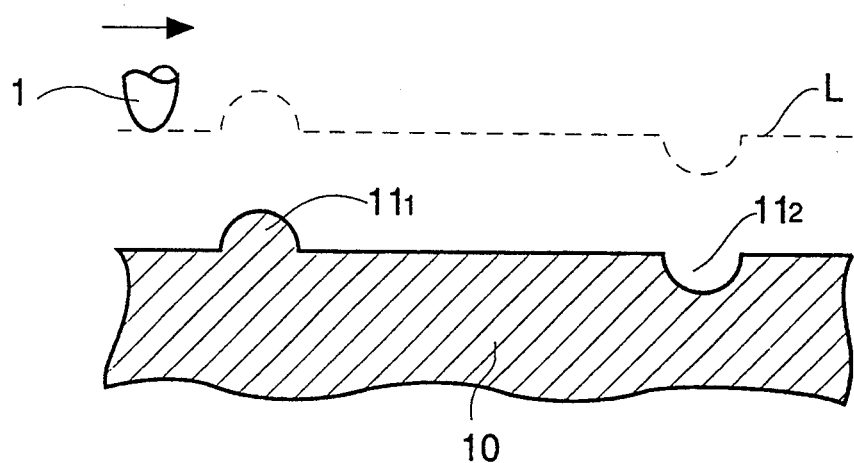
FIGS. 1, 2, and 3 are schematic views for explaining a method of observing samples by using a conventional scanning probe microscope.
Figure 2:
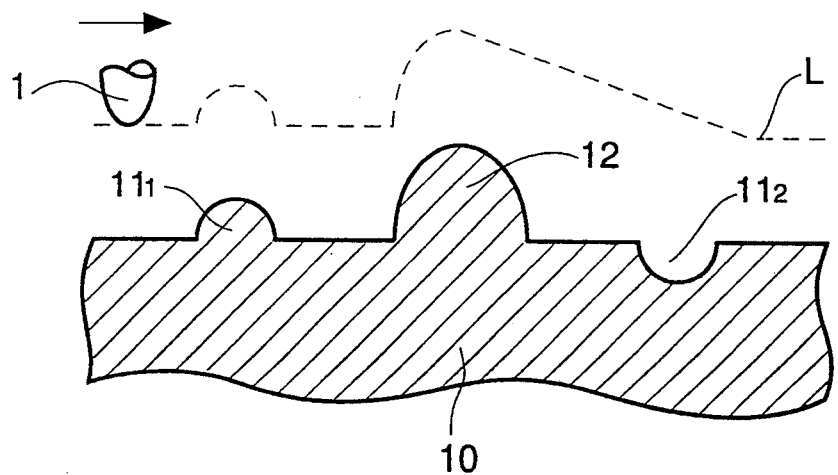
Figure 3:
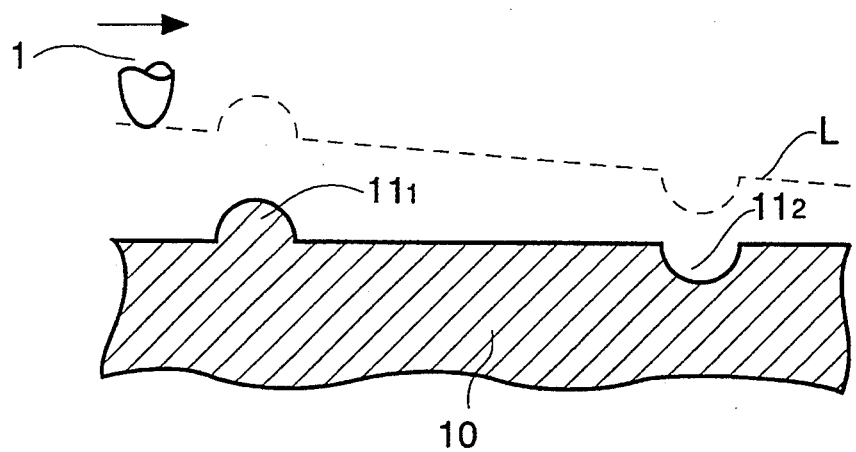
Figure 4:
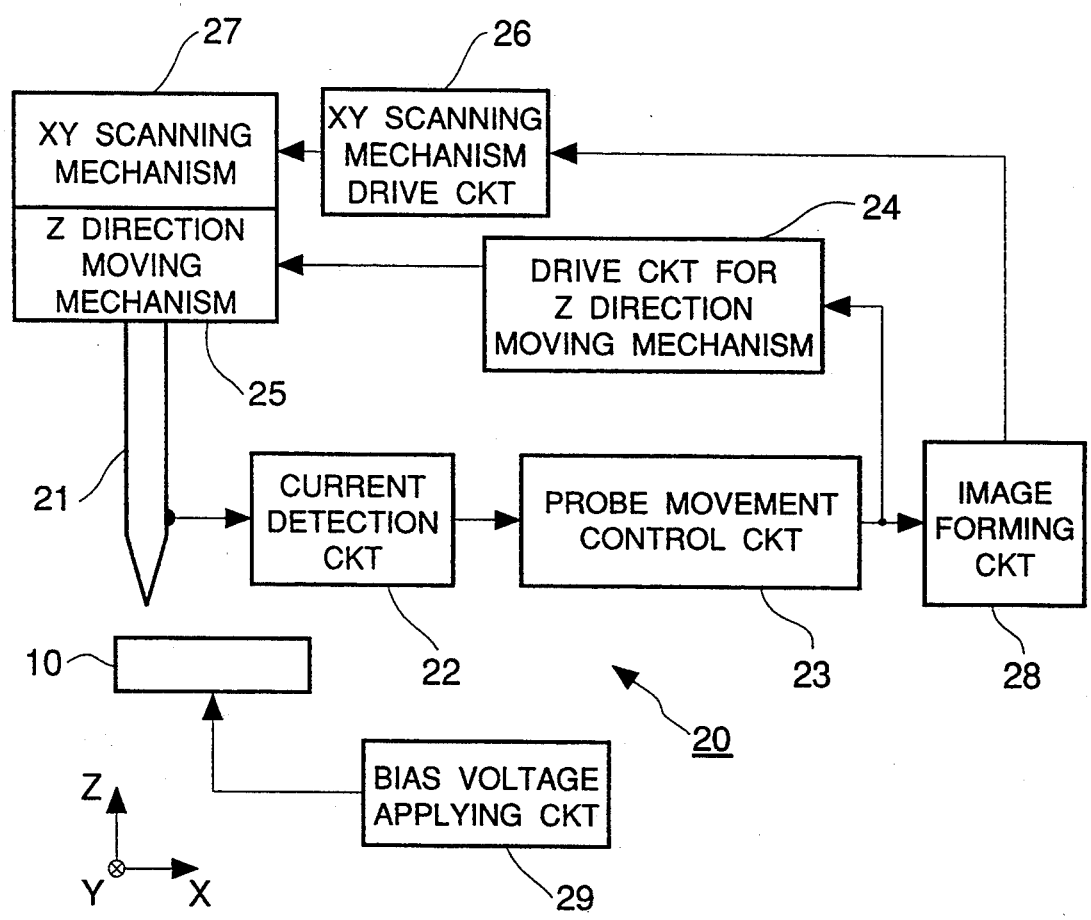
FIG. 4 is a block diagram showing the first embodiment of a scanning probe microscope according to the present invention.

FIG. 4 is a block diagram showing the construction of a scanning tunneling microscope as the first embodiment of a scanning probe microscope according to the present invention.

A scanning tunneling microscope 20 of this embodiment comprises a probe 21; a current detection circuit 22 for detecting the value of a tunnel current produced by an interaction between the probe 21 and the surface of a sample 10; a probe movement control circuit 23, a Z-direction moving mechanism drive circuit 24, and a Z-direction moving mechanism 25, which move the probe 21 in a direction (Z-axis direction in FIG. 4) perpendicular to the surface of the sample 10 in accordance with the detected value of the tunnel current, thereby changing the distance between the probe 21 and the surface of the sample 10; an XY scanning mechanism drive circuit 26 and an XY scanning mechanism 27, which scan the probe 21 two-dimensionally (in the X- and Y-axis directions in FIG. 4) relative to the surface of the sample 10; an image forming circuit 28 for sampling a probe movement control signal (a signal indicating the amount of movement of the probe 21 in the Z-axis direction in FIG. 4) output from the probe movement control circuit 23 while the probe 21 is two-dimensionally scanned, and forming image data corresponding to the two-dimensional coordinates (X and Y coordinates in FIG. 4) of the probe 21 in the scan region from the probe movement control signal sampled, thereby forming an image of the surface structure of the sample 10; and a bias voltage applying circuit 29 for applying a predetermined voltage to the sample 10.

The XY scanning mechanism drive circuit 26 and the XY scanning mechanism 27 effect the scanning of the probe 21 forward and backward in a scan direction (the X-axis direction in FIG. 4) with a higher scan rate of two-dimensional scan directions of the probe 21. The image forming circuit 28 forms first image data in a forward one of the forward and backward scans of the probe 21 performed by the XY scanning mechanism drive circuit 26 and the XY scanning mechanism 27, and forms second image data in a backward one of the forward and backward scans of the probe 21 performed by the XY scanning mechanism drive circuit 26 and the XY scanning mechanism 27. The image forming circuit 28 then detects a region in which the first and second image data are different from each other, and replaces the first or second image data in the detected region with the second or first image data in that region, forming third image data. The image forming circuit 28 forms an image of the surface structure of the sample 10 from the third image data thus formed.

Figure 5:
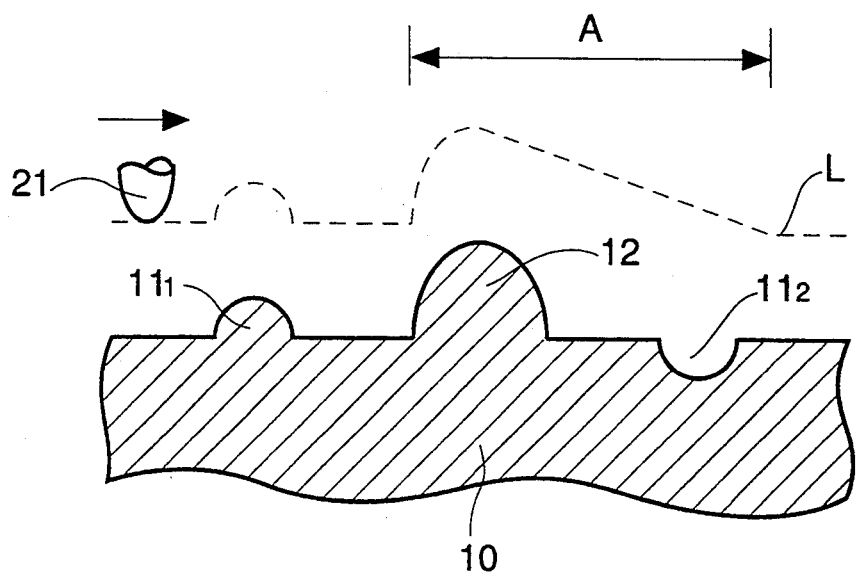
FIGS. 5, 6, and 7 are schematic views for explaining a method of observing samples by using the scanning probe microscope shown in FIG. 4.

The operation of the scanning tunneling microscope 20 will be described below by taking a measurement of the surface structure of the sample 10, in which, as shown in FIG. 5, a projection 12 larger than a projection $11_1$ and a recess $11_2$ exists between the projection $11_1$ and the recess $11_2$, as an example.

The current detection circuit 22 detects the value of a tunnel current produced by an interaction between the probe 21 and the surface of the sample 10. The probe movement control circuit 23 compares the value of the tunnel current detected by the current detection circuit 22 with a preset current value and outputs a probe movement control signal corresponding to the difference to the Z-direction moving mechanism drive circuit 24. The Z-direction moving mechanism drive circuit 24 forms a Z-direction drive signal according to the probe movement control signal from the probe movement control circuit 23 and outputs the Z-direction drive signal to the Z-direction moving mechanism 25. Consequently, the Z-direction moving mechanism 25 moves the probe 21 in the Z-axis direction in FIG. 4 such that the distance between the probe 21 and the surface of the sample 10 is maintained constant.

While feedback control is performed for the distance between the probe 21 and the surface of the sample 10 as described above, the XY scanning mechanism drive circuit 26 drives the XY scanning mechanism 27 to effect the scanning of the probe 21 (forward) from the left to the right end (FIG. 4) of the sample 10 along the X-axis direction in FIG. 4. At the same time, the image forming circuit 28 samples and stores the probe movement control signals from the probe movement control circuit 23 in synchronism with driving of the XY scanning mechanism 27. The image forming circuit 28 processes the probe movement control signals as height data corresponding to the X and Y coordinates, forming first image data of one scan operation on the surface of the sample 10.

At this time, if the scan rate of the probe 21 is increased to shorten the measurement time, the feedback control of the distance between the probe 21 and the surface of the sample 10 can no longer follow a portion including the projection 12, and so a locus L of the probe 21 becomes one as indicated by a broken line in FIG. 5. That is, in the portion around the projection 12, the probe 21 moves very close to the surface of the projection 12 and then moves away very far from it; the probe 21 is returned to the state in which the distance between the probe 21 and the surface of the sample 10 is controlled to the one that is determined by the preset value of a tunnel current after the probe 21 moves away very far from the projection 12 along the scan direction. Thus, the probe 21 cannot satisfactorily trace the surface structure of the sample 10 in a region A shown in FIG. 5, and the tunnel current flows too much or does not flow at all in this region A. As a consequence, the output probe movement control signal from the probe movement control circuit 23 is saturated to cause the first image data formed by the image forming circuit 28 to indicate an image which looks as if it has a long shadow. Therefore, in a portion (on the right side of the projection 12 in the region A) corresponding to the shadow, a measurement of the surface structure is totally impossible even if the surface is flat. Consequently, the first image data shows an image in which no indication of the recess $11_2$ appears.

In the scanning tunneling microscope 20 of this embodiment, therefore, after the first image data of one scan operation on the surface of the sample 10 is obtained, the image forming circuit 28 sends an instruction to the XY scanning mechanism drive circuit 26 to scan the probe 21 from the right to the left end (FIG. 4) of the sample 10 (i.e., in the opposite direction on the previously scanned line) along the X-axis direction in FIG. 4. As a result, the scanning of the probe 21 is effected (backward) from the right to the left end (FIG. 4) of the sample 10 along the X-axis direction in FIG. 4. Simultaneously, the image forming circuit 28 samples and stores the output probe movement control signals from the probe movement control circuit 23 in synchronism with driving of the XY scanning mechanism 27, forming second image data of one scan operation on the surface of the sample 10 in the same manner as described above.

Figure 6:
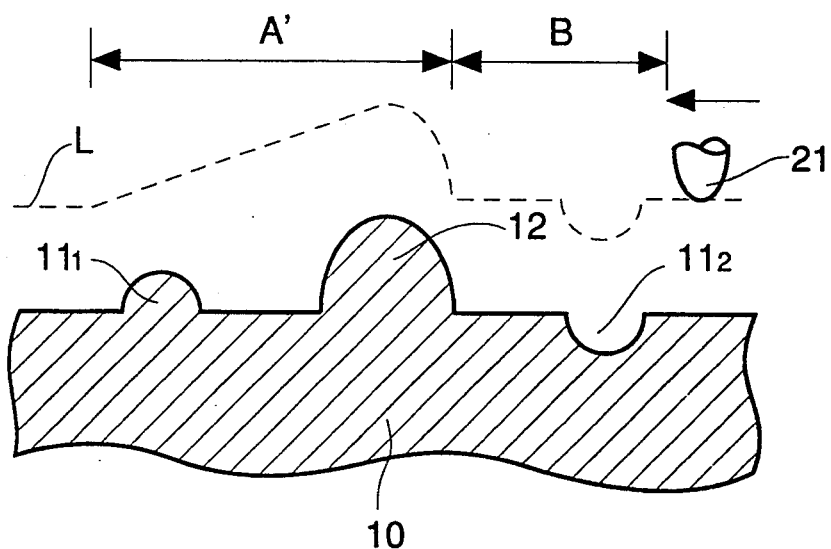

In this case, if the scan rate of the probe 21 is raised in order to shorten the measurement time, the feedback control of the distance between the probe 21 and the surface of the sample 10 can no longer follow the portion including the projection 12 with the result that the locus L of the probe 21 becomes the one indicated by a broken line shown in FIG. 6. That is, when the scanning of the probe 21 is effected from the right to the left end in FIG. 4, the second image data also demonstrates an image with a long shadow in the scan direction in a portion corresponding to a region A′ in FIG. 6. Consequently, a measurement of the surface structure becomes totally impossible in a portion (on the left side of the projection 12 in the region A′) corresponding to the shadow even if the surface is flat, and the second image data shows an image with no indication of the projection $11_1$. However, it is possible to accurately measure the surface structure of the sample 10 in a portion (region B in FIG. 6) on the right side of the projection 12 in the region A shown in FIG. 5.

Figure 7:
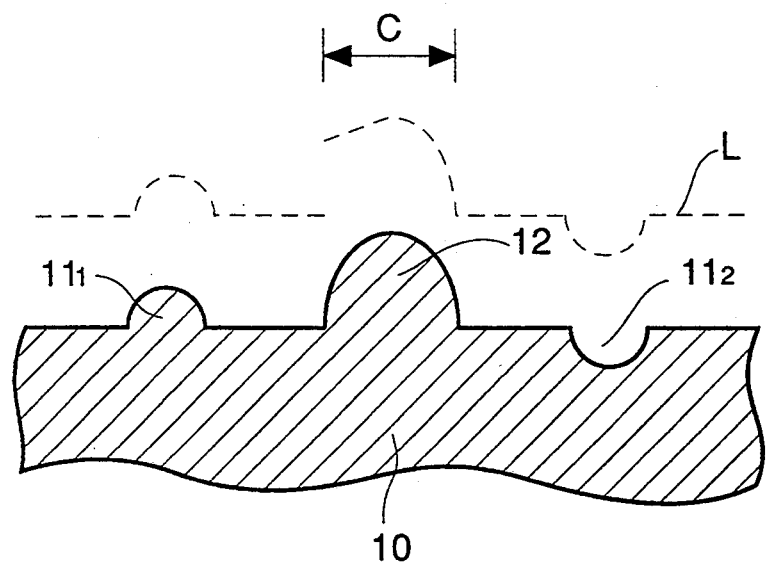

The image forming circuit 28, therefore, forms third image data by replacing data corresponding to the region A of the first image data with data corresponding to that region of the second image data. The obtained third image data shows an image corresponding to the locus L of the probe 21, as shown in FIG. 7, in which both the projection $11_1$ and the recess $11_2$ appear. Note that the surface structure of the sample 10 cannot be correctly obtained in a region C shown in FIG. 7 even by the use of the third image data. In a measurement of a surface structure using a scanning tunneling microscope, however, the large projection 12 is not an object to be measured, and so particularly no problem arises.

A method of replacing the data corresponding to the region A of the first image data with the data corresponding to that region of the second image data is to compare the first image data with the second image data to automatically recognize the region A of the first image data, in which data is to be replaced, or to preset a predetermined threshold value to perform replacement for a region in which data of the first image data exceeds the threshold value.

As described above, the use of the scanning tunneling microscope 20 shown in FIG. 4 makes it possible to accurately measure the surface structure of the sample 10 without lowering the scan rate of the probe 21 even if the sample 10 has the large projection 12 that the feedback control cannot follow. It is also possible to correctly measure the surface structure of a sample having a large recess or a large step that the feedback control cannot follow as well as the sample 10 having the large projection 12 that the feedback control cannot trace. In addition, since the scanning tunneling microscope 20 can express the electron condition on the surface of a sample as undulations in an image, an accurate measurement can be performed not only for the surface structure but for the electron condition of a sample.

In the above description, data corresponding to the region A of the first image data is replaced with data corresponding to that region of the second image data. However, data corresponding to the region A′ of the second image data may be replaced with data corresponding to that region of the first image data.

In addition, although the above embodiment has been described by taking the scanning tunneling microscope 20 as an example, the embodiment is generally applicable to scanning probe microscopes including an atomic force microscope (AFM).

Figure 8:
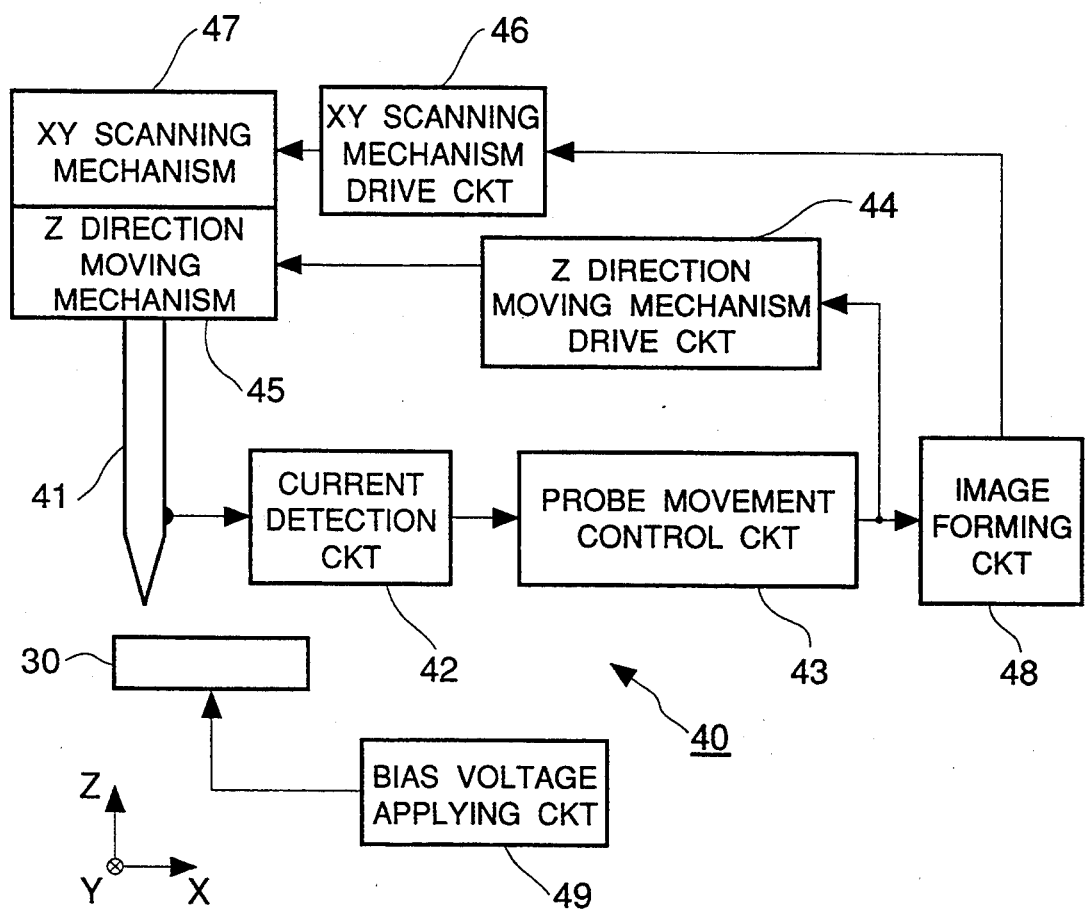
FIG. 8 is a block diagram showing the second embodiment of a scanning probe microscope according to the present invention.

FIG. 8 is a block diagram showing the construction of a scanning tunneling microscope as the second embodiment of the scanning probe microscope of the present invention.

Referring to FIG. 8, a scanning tunneling microscope 40 of this embodiment comprises, like the scanning tunneling microscope 20 shown in FIG. 4, a probe 41; a current detection circuit 42 for detecting the value of a tunnel current produced by an interaction between the probe 41 and the surface of a sample 30; a probe movement control circuit 43, a Z-direction moving mechanism drive circuit 44, and a Z-direction moving mechanism 45, which move the probe 41 in a direction (Z-axis direction in FIG. 8) perpendicular to the surface of the sample 30 in accordance with the detected value of a tunnel current, thereby changing the distance between the probe 41 and the surface of the sample 30; an XY scanning mechanism drive circuit 46 and an XY scanning mechanism 47, which effect the scanning of the probe 41 two-dimensionally (in the X- and Y-axis directions in FIG. 8) relative to the surface of the sample 30; an image forming circuit 48 for sampling a probe movement control signal (a signal designating the amount of movement of the probe 41 in the Z-axis direction in FIG. 8) output from the probe movement control circuit 43 while the probe 41 is two-dimensionally scanned, and forming image data corresponding to the two-dimensional coordinates (X and Y coordinates in FIG. 8) of the probe 41 in the scan region from the probe movement control signal sampled, thereby forming an image of the surface structure of the sample 30; and a bias voltage applying circuit 49 for applying a predetermined voltage to the sample 30.

The scanning tunneling microscope 40, however, differs from the scanning tunneling microscope 20 shown in FIG. 4 in that the image forming circuit 48 forms an image of the surface structure of the sample 30 in accordance with a method to be described later.

Figure 9A:
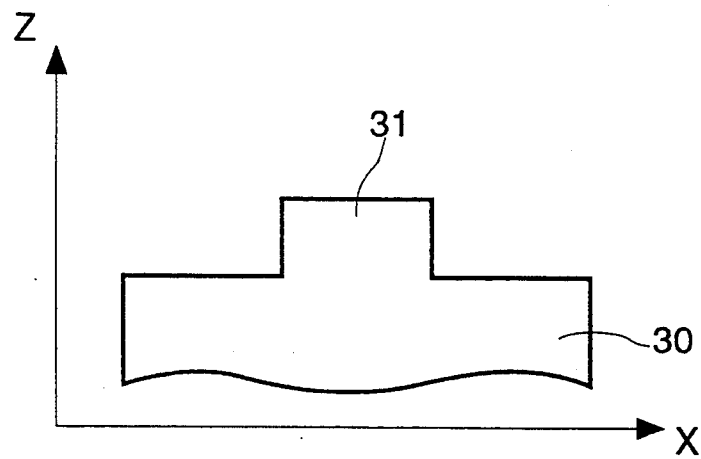
FIGS. 9A, 9B, and 9C are schematic views for explaining a method of observing samples by using the scanning probe microscope shown in FIG. 8.

The operation of the scanning tunneling microscope 40 will be described below by taking a measurement of the surface structure of the sample 30 having a rectangular projection 31 as shown in FIG. 9A as an example.

The current detection circuit 42 detects the value of a tunnel current produced by an interaction between the probe 41 and the surface of the sample 30. The probe movement control circuit 43 compares the value of the tunnel current detected by the current detection circuit 42 with a preset current value and outputs a probe movement control signal corresponding to the difference to the Z-direction moving mechanism drive circuit 44. The Z-direction moving mechanism drive circuit 44 forms a Z-direction drive signal according to the probe movement control signal from the probe movement control circuit 43 and outputs the Z-direction drive signal to the Z-direction moving mechanism 45. Consequently, the Z-direction moving mechanism 45 moves the probe 41 in the Z-axis direction in FIG. 8 such that the distance between the probe 41 and the surface of the sample 30 is maintained constant.

Figure 9B:
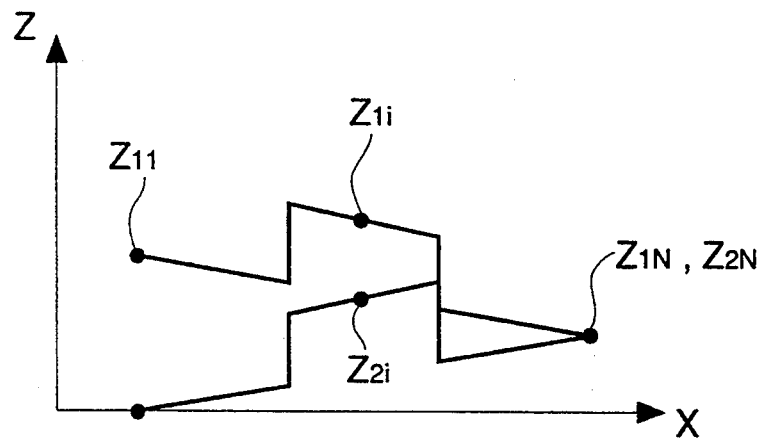

While feedback control is performed for the distance between the probe 41 and the surface of the sample 30 as described above, the XY scanning mechanism drive circuit 46 drives the XY scanning mechanism 47 to effect the scanning of the probe 41 (forward) from the left to the right end (FIG. 8) of the sample 30 along the X-axis direction in FIG. 8. At the same time, the image forming circuit 48 samples and stores the probe movement control signals from the probe movement control circuit 43 in synchronism with driving of the XY scanning mechanism 47. The image forming circuit 48 processes the probe movement control signals as height data corresponding to the X and Y coordinates, forming first image data of one scan operation on the surface of the sample 30. In this case, even when the scan rate of the probe 41 is decreased enough to accurately measure the surface structure of the sample 30, if the drift described above occurs, the first image data shows an image declined to the right as shown in FIG. 9B.

In the scanning tunneling microscope 40 of this embodiment, therefore, after the first image data of one scan operation on the surface of the sample 30 is obtained, the image forming circuit 48 sends an instruction to the XY scanning mechanism drive circuit 46 to effect the scanning of the probe 41 from the right to the left end (FIG. 8) of the sample 30 (i.e., in the opposite direction on the previously scanned line) along the X-axis direction in FIG. 8. As a result, the scanning of the probe 41 is effected (backward) from the right to the left end (FIG. 8) of the sample 30 along the X-axis direction in FIG. 8. Simultaneously, the image forming circuit 48 samples and stores the output probe movement control signals from the probe movement control circuit 43 in synchronism with driving of the XY scanning mechanism 47, forming second image data of one scan operation on the surface of the sample 30 in the same manner as described above. At this time, even when the scan rate of the probe 41 is decreased enough to correctly measure the surface structure of the sample 30, since the above-mentioned drift still exists, the second image data shows an image declined to the left as shown in FIG. 9B.

To obtain a correct surface structure of the sample 30 from the first and second image data, the image forming circuit 48 executes a calculation represented by:

$$Z_i = \left\{ (Z_{1i} + Z_{2i}) - \sum_{i=1}^{N} (Z_{1i} + Z_{2i})/N \right\}/2 \quad (1)$$

where

N = the number of samples of the first image data (= the number of samples of the second image data)

Figure 9C:
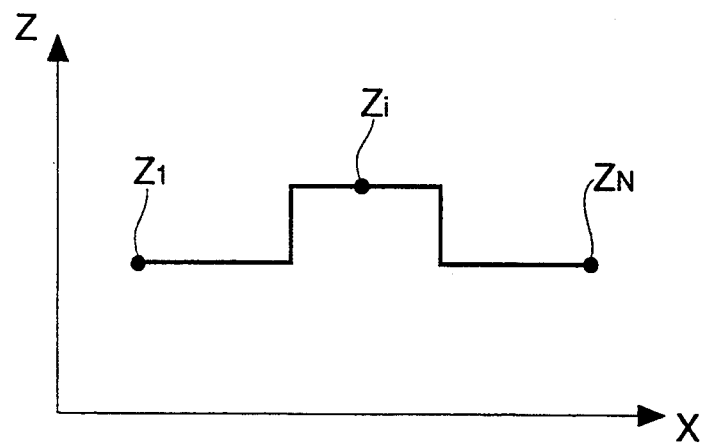

$Z_{1i}$ = the i-th sample of the first image data from the left end shown in FIG. 9B $Z_{2i}$ = the sample of the second image data corresponding to the i-th sample of the first image data from the left end shown in FIG. 9B. Consequently, as shown in FIG. 9C, the influence of the drift described above can be removed from the calculated image data, and an image accurately indicating the surface structure of the sample 30 can be obtained.

The use of the scanning probe microscope 40 of this embodiment, therefore, makes it possible to perform measurements without waiting until the obtained image is stabilized even if the above-mentioned drift is found, thereby shortening the measurement time.

Note that the image forming circuit 48 can perform a calculation given by:

$$Z_i = (Z_{1i} + Z_{2i})/2 \quad (2)$$

instead of Equation (1) shown above. In this case, a DC component is produced in the image data calculated. Therefore, in obtaining the surface structure of the entire surface of the sample 30 by two-dimensionally scanning of the probe 41, this DC component may change in each scan operation owing to the change in drift amount with time, resulting in some inconvenience. However, particularly no problem arises in obtaining the surface structure of one scan operation of the sample 30.

Although the second embodiment has been described above by taking the scanning tunneling microscope as an example, this embodiment is also generally applicable to scanning probe microscopes including an atomic force microscope (AFM).

What is claimed is:

1. A scanning probe microscope comprising:
   a probe arranged to oppose a surface of a sample;

scanning means for scanning the same portion of the surface of the sample forward and backward by using said probe;

detecting means for detecting a signal corresponding to a structure of the sample from said probe, said detecting means detecting a first signal during a period in which said probe scans the sample forward and a second signal during a period in which said probe scans the sample backward; and correcting means for generating a corrected signal by replacing a portion of one of the first and second signals with a portion of the other signal.

2. A microscope according to claim 1, further comprising means for applying a voltage between said probe and the sample, wherein said detecting means comprises a current detection circuit for detecting a tunnel current flowing through said probe, and control means for controlling a distance between said probe and the surface of the sample in accordance with the tunnel current detected by said current detection circuit.

3. A microscope according to claim 2, wherein said control means comprises a moving mechanism for moving said probe in a direction perpendicular to the surface of the sample, and a control circuit for performing feedback control for said moving mechanism in accordance with an output from said current detection circuit.

4. A microscope according to claim 1, wherein said correcting means comprises an image forming circuit for forming an image of the sample on the basis of the corrected signal.

5. A microscope according to claim 1, wherein said correcting means compares one of the signals with a predetermined threshold value and replaces a portion of the signal exceeding the threshold value with a portion of the other signal.

6. A method of observing samples by using a scanning probe microscope, comprising the steps of:

scanning the same portion of a surface of a sample forward and backward by using a probe;

detecting a first signal corresponding to a structure of the sample from said probe during a period in which said probe scans the sample forward;

detecting a second signal corresponding to the structure of the sample from said probe during a period in which said probe scans the sample backward; and generating a corrected signal by replacing a portion of one of the first and second signals with a portion of the other signal.

7. A method according to claim 6, further comprising the step of forming an image of the sample on the basis of the corrected signal.

8. A method according to claim 6, wherein in the step of generating the corrected signal, one of the signals is compared with a predetermined threshold value, and a portion of the signal exceeding the threshold value is replaced with a portion of the other signal.

9. A scanning probe microscope comprising:

a probe arranged to oppose a surface of a sample;

driving means for driving said probe over the same portion of said surface in a first direction and a second direction perpendicular to the first direction relative to the surface of the sample, said driving means driving said probe forward and backward in one of the first and second directions;

a detection circuit for detecting image data corresponding to a structure of the sample from said probe, said detection circuit detecting first image data during a period in which said probe is driven forward and second image data during a period in which said probe is driven backward; and an image forming circuit for generating corrected image data by replacing a portion of one of the first and second image data with a portion of the other data.

10. A microscope according to claim 9, further comprising a voltage applying circuit for applying a voltage between said probe and the sample, wherein said detection circuit comprises a current detection circuit for detecting a tunnel current flowing through said probe, a moving mechanism for moving said probe in a direction perpendicular to the surface of the sample, and a control circuit for performing feedback control for said moving mechanism in accordance with an output from said current detection circuit.

11. A scanning probe microscope comprising:

a probe arranged to oppose a surface of a sample;

scanning means for scanning the same portion of the surface of the sample forward and backward by using said probe;

a detection circuit for detecting image data corresponding to a structure of the sample from said probe, said detection circuit sampling first image data consisting of N (=integer of not less than 2) samples during a period in which said probe scans the sample forward and second image data consisting of N samples during a period in which said probe scans the sample backward; and an image forming circuit for generating third image data consisting of N samples $Z_i$ (i=1, 2, ..., N), which satisfy an equation below, from the first and second image data:

$$Z_i = \left\{ (Z_{1i} + Z_{2i}) - \sum_{i=1}^{N} (Z_{1i} + Z_{2i})/N \right\}/2$$

where $Z_{1i}$ is the i-th sample of the first image data and $Z_{2i}$ is the sample of the second image data corresponding to $Z_{1i}$.

12. A microscope according to claim 11, further comprising a voltage applying circuit for applying a voltage between said probe and the sample, wherein said detection circuit comprises a current detection circuit for detecting a tunnel current flowing through said probe, a moving mechanism for moving said probe in a direction perpendicular to the surface of the sample, and a control circuit for performing feedback control for said moving mechanism in accordance with an output from said current detection circuit.

13. A microscope according to claim 11, wherein said scanning means comprises a two-dimensional scanning mechanism for moving said probe forward and backward in a first direction and moving said probe in a second direction perpendicular to the first direction along the surface of the sample.

14. A method of detecting image data of samples by using a scanning probe microscope, comprising the steps of:

scanning the same portion of a surface of a sample forward and backward by using a probe;

sampling first image data consisting of N (=integer of not less than 2) samples, which correspond to a structure of the sample, from said probe during a period in which said probe scans the sample forward;

sampling second image data consisting of N samples, which correspond to the structure of the sample, from said probe during a period in which said probe scans the sample backward; and generating third image data consisting of N samples $Z_i$ (i=1, 2, ..., N), which satisfy an equation below, from the first and second image data:

$$Z_i = \left\{ (Z_{1i} + Z_{2i}) - \sum_{i=1}^{N} (Z_{1i} + Z_{2i})/N \right\}/2$$

where $Z_{1i}$ is the i-th sample of the first image data and $Z_{2i}$ is the sample of the second image data corresponding to $Z_{1i}$.

15. A scanning probe microscope comprising:
a probe arranged to oppose a surface of a sample;
scanning means for scanning the same portion of the surface of the sample forward and backward by using said probe;
a detection circuit for detecting image data corresponding to a structure of the sample from said probe, said detection circuit sampling first image data consisting of N (=integer of not less than 2) samples during a period in which said probe scans the sample forward and second image data consisting of N samples during a period in which said probe scans the sample backward; and
an image forming circuit for generating third image data consisting of N samples $Z_i$ (i=1, 2, ..., N), which satisfy an equation below, from the first and second image data:

$$Z_i = (Z_{1i} + Z_{2i})/2$$

where $Z_{1i}$ is the i-th sample of the first image data and $Z_{2i}$ is the sample of the second image data corresponding to $Z_{1i}$.

16. A microscope according to claim 15, further comprising a voltage applying circuit for applying a voltage between said probe and the sample,
wherein said detection circuit comprises a current detection circuit for detecting a tunnel current flowing through said probe, a moving mechanism for moving said probe in a direction perpendicular to the surface of the sample, and a control circuit for performing feedback control for said moving mechanism in accordance with an output from said current detection circuit.

17. A microscope according to claim 15, wherein said scanning means comprises a two-dimensional scanning mechanism for moving said probe forward and backward in a first direction and moving said probe in a second direction perpendicular to the first direction along the surface of the sample.

18. A method of detecting image data of samples by using a scanning probe microscope, comprising the steps of:
scanning the same portion of a surface of a sample forward and backward by using a probe;
sampling first image data consisting of N (=integer of not less than 2) samples, which correspond to a structure of the sample, from said probe during a period in which said probe scans the sample forward;
sampling second image data consisting of N samples, which correspond to the structure of the sample, from said probe during a period in which said probe scans the sample backward; and
generating third image data consisting of N samples $Z_i$ (i=1, 2, ..., N), which satisfy an equation below, from the first and second image data:

$$Z_i = (Z_{1i} + Z_{2i})/2$$

where $Z_{1i}$ is the i-th sample of the first image data and $Z_{2i}$ is the sample of the second image data corresponding to $Z_{1i}$.

* * * * *